Patented Sept. 8, 1936

2,053,278

UNITED STATES PATENT OFFICE 2,053,278

AMINO-ANTHRAQUINONES AND PROCESS FOR THEIR PRODUCTION

George Holland Ellis and Frank Brown, Spondon, near Derby, England, assignors to Celanese Corporation of America, a corporation of Delaware No Drawing. Original application February 7, 1933, Serial No. 655,616. Divided and this application April 19, 1935, Serial No. 17,256. In Great Britain February 17, 1932

7 Claims. (Cl. 260—60)

This application relates to the manufacture of new compounds of the anthraquinone series, and is a divisional of U. S. application S. No. 655,616, filed 7th February, 1933, issued Feb. 4, 1936 as Patent No. 2,029,313.

We have found that unsulphonated anthraquinone compounds in which the anthraquinone nucleus contains, as sole amino substituents, an amino group or an aliphatically substituted amino group and in para position thereto an arylamino group having an aliphatic ether group as a substituent, are valuable colouring matters for cellulose esters and ethers. The above mentioned pair of amino groups may be present in the molecule once only as in 1-amino-4-orthomethoxy-phenylamino-anthraquinone or twice as in 1,5-diamino-4,8-di-(ortho-methoxy-phenylamino)-anthraquinone. Particularly valuable are those compounds in which the aliphatic ether group present in the arylamino group or groups is in ortho position to the amino nitrogen.

The present invention accordingly comprises these new unsulphonated anthraquinone compounds and methods for their production.

With the aid of these new compounds it is possible to produce on cellulose ester or ether materials valuable blue shades of extremely good resistance to the agencies which textile materials are commonly required to withstand. As is well known, certain amino and simple alkylamino derivatives of anthraquinones yield blue shades upon cellulose ester or ether materials but many of these shades suffer from a lack of resistance to the combined action of light and acid fumes, for example combustion products of coal gas. This lack of resistance is particularly objectionable in that in general it involves a considerable change in shade towards red and not merely a reduction in the intensity of the dyeing. While a considerable improvement may be effected by introducing aryl radicles into one or more amino groups of the colouring matters, the resistance it is possible to obtain to the combined action of light and acid is still far from absolute.

We have found that the dyestuffs of the present invention, and especially those in which an ortho-alkoxy-phenylamino group is in para position to each amino or aliphatically substituted amino substituent in the anthraquinone nucleus, for example 1-amino-4-(ortho-methoxy-phenylamino)-anthraquinone, are, as regards the fastness of their colourations on cellulose esters or ethers to the combined action of light and acid, a considerable improvement over known anthraquinone compounds differing therefrom by the absence of the ether substituent in the arylamino groups. Any fading which may take place under the combined action of acid and light is in the direction of a reduction in the intensity of color instead of a marked change towards red. In consequence any change which takes place under the acidic conditions is far less noticeable than in the case of the said known compounds. This is a point of particular importance when the colouring matter is employed in compound shades.

The aryl group of the arylamino substituent or substituents may be of any desired character. For example, it may be of the benzene, naphthalene or other series. Preferably, however, the arylamino residue is of the benzene series. Aliphatic ether groups present in the arylamino group or groups may be of various characters. Preferably, however, the ether residues are of relatively low mass, for example methoxy, ethoxy or other alkoxy or an ω-hydroxy-ethoxy or other substituted alkoxy group. The aliphatic ether residues may be in various positions in the aryl group of the arylamino group, for example ortho, meta or para to the amino nitrogen in the case of a benezene residue. Preferably, however, they are in ortho positions to the amino nitrogens.

Other substituents may, if desired, be present in the ether substituted aryl residues of the arylamino groups, for example nitro, halogen, alkyl or acidylamino groups. There may also be present in the anthraquinone molecule of the compounds of the invention, substituents other than the amino or aliphatically substituted amino groups or ether substituted arylamino groups characteristic of the compounds. Further amino groups should not, however, be present.

As examples of specific compounds included in the scope of the invention, mention may be made of 1-amino-4-ortho-methoxy-phenylamino-anthraquinone, 1-ω-oxyethylamino-4-ortho-methoxy phenylamino-anthraquinone, 1-amino-4-(2′,5′-dimethoxy-phenylamino)-anthraquinone, 1-amino-4-(2′methoxy-5′-methyl-phenylamino)-anthraquinone and 1,5-diamino-4,8-di-orthomethoxy-phenylamino-anthraquinone. These amino anthraquinone compounds dye cellulose acetate and other cellulose esters or ethers in valuable blue shades when applied thereto in the form of aqueous suspensions or dispersions. Especially valuable are the dyeing properties of 1-amino-4-ortho-methoxy-phenylamino-anthraquinone. The dyeing of cellulose esters or ethers with the amino anthraquinone derivatives of the present invention is described and claimed in the parent application S. No. 655,616, filed February 7th, 1933.

Various methods may be employed for the production of these new unsulphonated arylamino anthraquinones substituted in the aryl residue by ether groups. Thus, reactive groups present as substituents in suitable anthraquinone derivatives may be replaced by arylamino residues of the desired character by the action of appropriate alkoxy or other ether substituted aromatic amines. As examples of such aromatic amines may be mentioned o-anisidine, o-phenetidine, amino-hydroquinone dimethylether, and 3-amino-4-methoxy-1-methylbenzene. Again, amino anthraquinones may be subjected to the action of agents capable of introducing into an amino group an aryl residue substituted in the desired manner.

As examples of atoms or groups readily replaceable by arylamino residues mention may be made of nitro, hydroxy, amino, chlorine or other halogen atoms, and sulphonic groups. As examples of specific compounds containing such reactive atoms or groups reference may be made to 1-amino-4-hydroxy or alkoxy anthraquinone, 1-amino-4-nitro-anthraquinone, 1-amino-4-brom anthraquinone, 1,4-dihydroxy anthraquinone, 4-nitro- or 4-amino-chrysazin, 4-nitro- or 4-amino-anthrarufin, dinitro- or diamino-anthrarufin, dinitro- or diamino-chrysazin, 4-chlor chrysazin or 4-chlor anthrarufin, 4-amino-1,5- or 4-amino-1,8-dichlor anthraquinone and 5,8-dichlor-1,2-benzanthraquinone.

In addition to replacing one or more reactive groups by etherified arylamino residues, other of the reactive groups may be replaced by other substituents before or after the introduction of the arylamino residue. Thus, for instance reactive substituents may be replaced by primary amino groups or by alkyl or substituted alkylamino groups, e. g. a nitro group may be reduced to a primary amino group or a nitro group, hydroxyl group or halogen atom replaced by an amino or aliphatically substituted amino group by the action of ammonia or an aliphatic amine such as methylamine or oxyethylamine.

If desired instead of introducing etherified arylamino residues into anthraquinone compounds, the ether groups may be introduced into aryl residues of arylamino-anthraquinones. Thus suitable substituents present in the aryl residues may be converted into or replaced by ether groups. For example a hydroxy group may be alkylated or a halogen atom replaced by alkoxy by the action of a sodium alcoholate.

The manufacture of dyestuffs in accordance with the invention is illustrated by the following examples:—

*Example 1*

Preparation of 1,5 - di(2' - methoxyphenylamino) -4,8-diamino-anthraquinone.

1 part of 4,8-diaminoanthrarufin is heated with 4 parts of ortho-anisidine and 0.5 parts boric acid for several hours at the boiling point. The new dyestuff crystallizes out in good yield on cooling, and is filtered off and washed free from ortho-anisidine and boric acid. It dissolves in most organic solvents with a blue to blue-green colouration.

*Example 2*

Preparation of 1-amino-4-(2'-methoxy-phenylamino)-anthraquinone.

1 part of 1-amino-4-methoxy-anthraquinone is heated at 160–170° C. with 4 parts of ortho-anisidine until no further formation of blue colour takes place. After cooling the new dyestuff is precipitated by the addition of an equal volume of methyl alcohol and is filtered off and dried.

What we claim and desire to secure by Letters Patent is:—

1. As a new product, an unsulphonated anthraquinone compound in which the anthraquinone nucleus contains at least one group, selected from amino and aliphatically substituted amino, which has, in para position thereto, an arylamino group of the benzene series having a group selected from methoxy and ethoxy as a substituent in ortho position to the amino nitrogen, the said amino groups being the sole amino substituents in the anthraquinone nucleus.

2. As a new product, an unsulphonated anthraquinone compound in which the anthraquinone nucleus contains, as the sole nuclear amino substituents, a group selected from amino and aliphatically substituted amino, and in para position thereto, an arylamino group of the benzene series having a group selected from methoxy and ethoxy as a substituent in ortho position to the amino nitrogen.

3. As a new product 1 amino-4-(o-methoxyphenylamino)-anthraquinone.

4. As a new product 1,5-diamino-4,8-di-(o-methoxy-phenylamino)-anthraquinone.

5. Process for the production of new unsulphonated arylamino anthraquinones having an aliphatic ether group in the arylamino radicle, which comprises subjecting to the action of an arylamine of the benzene series having a group selected from methoxy and ethoxy in ortho position to the amino group, an anthraquinone compound containing in the anthraquinone nucleus a group, selected from amino and aliphatically substituted amino, having in para position thereto a substituent capable of replacement by an arylamino group by the action of an aromatic amine, said anthraquinone compound being free from further nuclear amino substituents.

6. Process for the production of 1-amino-4-(o-methoxy-phenylamino)-anthraquinone, which comprises subjecting 1-amino-4-methoxy-anthraquinone to the action of o-anisidine.

7. Process for the production of 1-amino-4-(o-methoxy-phenylamino)-anthraquinone, which comprises subjecting 1-amino-4-nitro-anthraquinone to the action of o-anisidine.

GEORGE HOLLAND ELLIS.
FRANK BROWN.